(12) United States Patent
Wang

(10) Patent No.: US 7,997,313 B2
(45) Date of Patent: Aug. 16, 2011

(54) ADJUSTABLE GUIDE BAR FOR WOODWORKING TABLE SLOT

(75) Inventor: Henry Wang, Winter Springs, FL (US)

(73) Assignee: Micro Jig, Inc., Winter Springs, FL (US)

( * ) Notice: Subject to any disclaimer, the term of this patent is extended or adjusted under 35 U.S.C. 154(b) by 80 days.

(21) Appl. No.: 11/869,631

(22) Filed: Oct. 9, 2007

(65) Prior Publication Data

US 2008/0083311 A1    Apr. 10, 2008

Related U.S. Application Data

(60) Provisional application No. 60/828,828, filed on Oct. 10, 2006.

(51) Int. Cl.
  *B23D 47/04*  (2006.01)
  *B25B 25/10*  (2006.01)
  *B26D 7/06*   (2006.01)

(52) U.S. Cl. ............ 144/286.1; 33/640; 83/435.11; 83/435.15; 83/437.2; 83/438; 83/477.2; 144/287

(58) Field of Classification Search .......... 254/42, 254/104; 83/435.11–435.15, 437.1, 437.2, 83/438, 522.15–522.19
See application file for complete search history.

(56) References Cited

U.S. PATENT DOCUMENTS

| | | | | |
|---|---|---|---|---|
| 228,410 | A * | 6/1880 | Squintani | 254/42 |
| 503,726 | A * | 8/1893 | Pryibil | 83/435.15 |
| 1,272,659 | A * | 7/1918 | Groomes | 101/390 |
| 2,164,615 | A * | 7/1939 | Mafera | 254/104 |
| 2,524,961 | A * | 10/1950 | Cramer, Jr. | 254/104 |
| 2,710,633 | A * | 6/1955 | Oberg | 83/435.14 |
| 2,759,503 | A * | 8/1956 | Goldschmidt | 83/707 |
| 3,171,632 | A * | 3/1965 | Jines | 254/104 |
| 3,735,206 | A * | 5/1973 | Pesek | 361/721 |
| 4,354,770 | A * | 10/1982 | Block | 403/409.1 |
| 4,971,570 | A * | 11/1990 | Tolle et al. | 439/327 |
| 5,038,486 | A * | 8/1991 | Ducate, Sr. | 33/430 |
| 5,097,601 | A | 3/1992 | Pollak et al. | |
| 5,207,007 | A * | 5/1993 | Cucinotta et al. | 33/640 |
| 5,220,485 | A * | 6/1993 | Chakrabarti | 361/720 |
| 5,275,074 | A | 1/1994 | Taylor et al. | |
| 5,379,669 | A * | 1/1995 | Roedig | 83/421 |
| 5,382,175 | A * | 1/1995 | Kunkel | 439/327 |
| 5,402,581 | A * | 4/1995 | Hurd et al. | 33/471 |
| 5,472,353 | A * | 12/1995 | Hristake et al. | 439/327 |
| 5,617,909 | A | 4/1997 | Duginske | |
| 5,735,054 | A * | 4/1998 | Cole | 33/471 |
| 5,941,514 | A * | 8/1999 | Burcaw | 269/37 |
| 6,195,905 | B1 * | 3/2001 | Cole | 33/640 |
| 6,237,457 | B1 * | 5/2001 | Taylor | 83/435.15 |
| 6,502,492 | B1 * | 1/2003 | Krohmer et al. | 83/435.13 |
| 6,532,679 | B2 * | 3/2003 | Cole | 33/640 |
| 6,672,190 | B2 * | 1/2004 | Taylor | 83/435.14 |
| 6,691,423 | B2 * | 2/2004 | Fontaine | 33/640 |
| 6,776,076 | B2 | 8/2004 | Salazar | |
| 7,245,199 | B1 * | 7/2007 | Reilly | 33/640 |
| 7,505,251 | B2 * | 3/2009 | Canfield et al. | 361/727 |

* cited by examiner

*Primary Examiner* — Clark F. Dexter
(74) *Attorney, Agent, or Firm* — David G. Maire; Beusse Wolter Sanks Mora & Maire, P.A.

(57) ABSTRACT

A guide bar assembly (10) for use in a T-slot (20) of a woodworking table (22). The assembly includes a top member (12) slidably disposed on a bottom member (14). The top and bottom members include cooperating pairs of wedge shapes (24) that cause a change in width (W) of the assembly in response to relative longitudinal (L) movement between the top and bottom members. Contacting angled side surfaces (30, 32) of the male and female wedge members (26, 28) provide area contact between the top and bottom members that functions to maintain the top and bottom members parallel during tightening of the fasteners (34) used to lock the assembly at a desired width.

5 Claims, 6 Drawing Sheets

ADJUSTABLE GUIDE BAR FOR WOODWORKING TABLE SLOT

CROSS REFERENCE TO RELATED APPLICATIONS

This application claims priority benefit of the 10 Oct. 2006 filing date of U.S. provisional patent application No. 60/828,828.

FIELD OF THE INVENTION

This invention relates generally to the field of woodworking and more particularly to a guide bar assembly for use within a slot on a woodworking table.

BACKGROUND OF THE INVENTION

High quality woodworking with safe operation requires the ability to maintain very close tolerances. Woodworking power tools such as table saws are known to include a straight groove or slot, known as a miter slot or a T-slot (referring to its common cross-sectional shape), for slidably receiving a guide bar. The guide bar moves within the T-slot to guide a work piece through a cutting tool, such as a saw blade, in a precise linear direction parallel to a desired cut line. Any gap between the width of the guide bar and the width of the slot allows for some undesirable horizontal and angular movement of the guide bar and the guided work piece as it is moved through the cutting tool.

The width of a T-slot has a nominal dimension, for example 750 mils on many table saws, but that dimension may vary by as much as 2-10 mils for any given table due to manufacturing tolerances. Such variation can create an unacceptable amount of positional uncertainty during woodworking operations. There is an ongoing effort in the woodworking industry to develop guide bars that can accommodate such variations in the slot width in order to minimize any gap between the width of the guide bar and the width of the slot. For example:

U.S. Pat. No. 5,097,601 issued on 24 Mar. 1992 describes the use of a plurality of set screws that can be rotated to project from the sides of the guide bar to span the gap between the guide bar and the slot, thereby ensuring a tight fit between the guide bar and the slot. Adjustment of the set screws prior to inserting the device into the slot requires a trial and error approach, or alternatively, adjustment of the set screws when the device is in the slot is difficult due to their horizontal orientation and limited access to the set screws.

U.S. Pat. No. 5,275,074 issued on 4 Jan. 1994 describes the use of a plurality of wedging members to spread apart sections of the guide bar side walls to ensure engagement with the adjoining slot walls. The wedging members are controlled by screws which can be accessed conveniently from above the slot. However, localized deformation of the guide bar side walls does not provide a uniform fit of the guide bar along the full length of the guide bar within the slot.

U.S. Pat. No. 5,402,581 issued on 4 Apr. 1995 and U.S. Pat. No. 6,502,492 issued 7 Jan. 2003 describe two-piece guide bar assembly designs wherein top and bottom members can be horizontally displaced relative to each other to expand the overall width of the device to obtain a uniform fit within the slot. In the '581 patent, the top and bottom members are urged apart by small springs to expand the device within the slot.

BRIEF DESCRIPTION OF THE DRAWINGS

The invention is explained in the following description in view of the drawings that show.

DETAILED DESCRIPTION OF THE INVENTION

In response to the continued need in the woodworking industry for maintaining tight tolerances, and in particular for ensuring a snug, uniform fit of a guide bar within a woodworking table T-slot, the present inventor has developed an innovative guide bar design that provides a high degree of functionality in a rugged, shop-worthy device.

Figure 1:
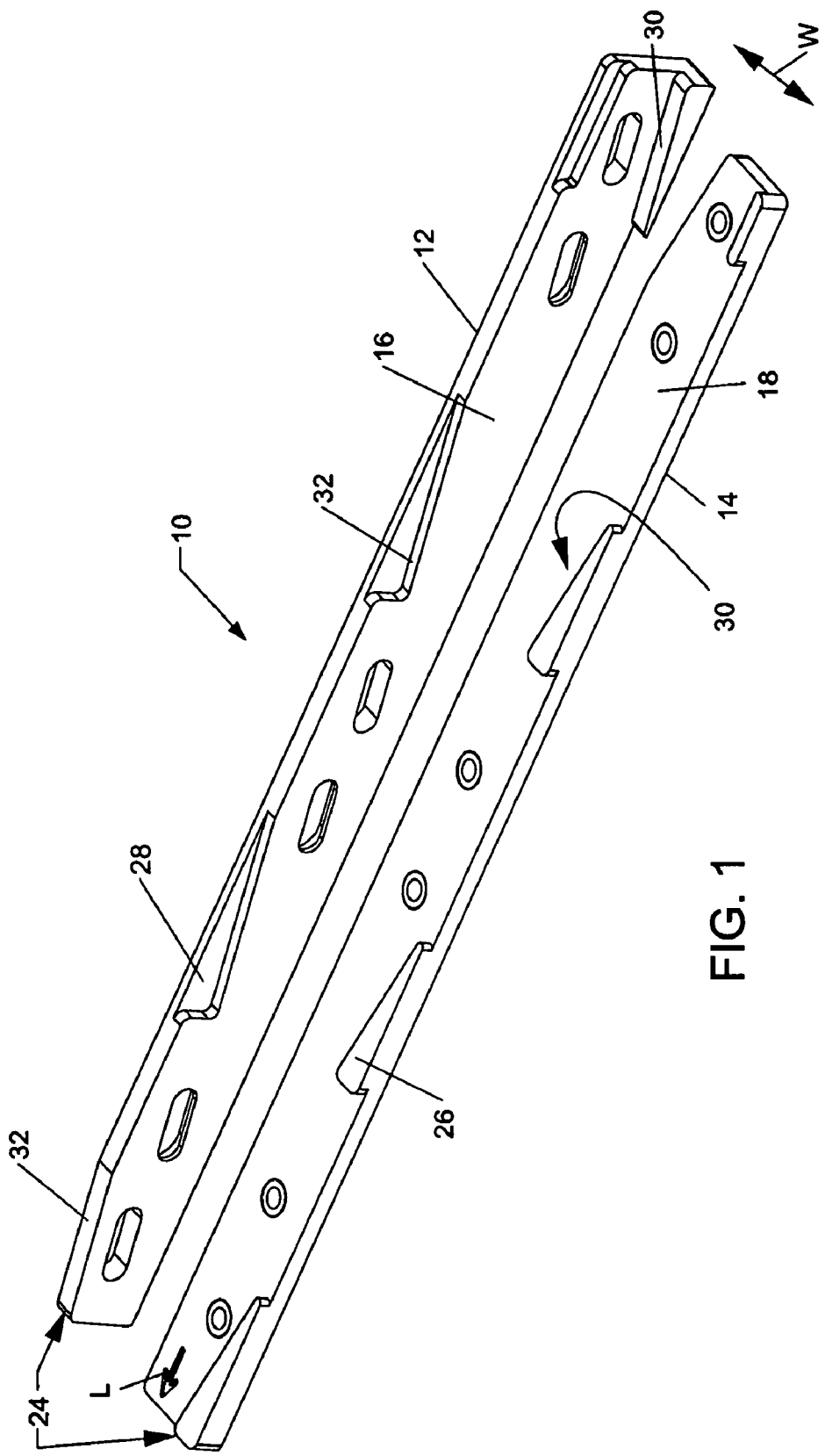
FIG. 1 is a perspective view of a guide bar assembly showing details of the mating surfaces of its top and bottom members.
Figure 2:
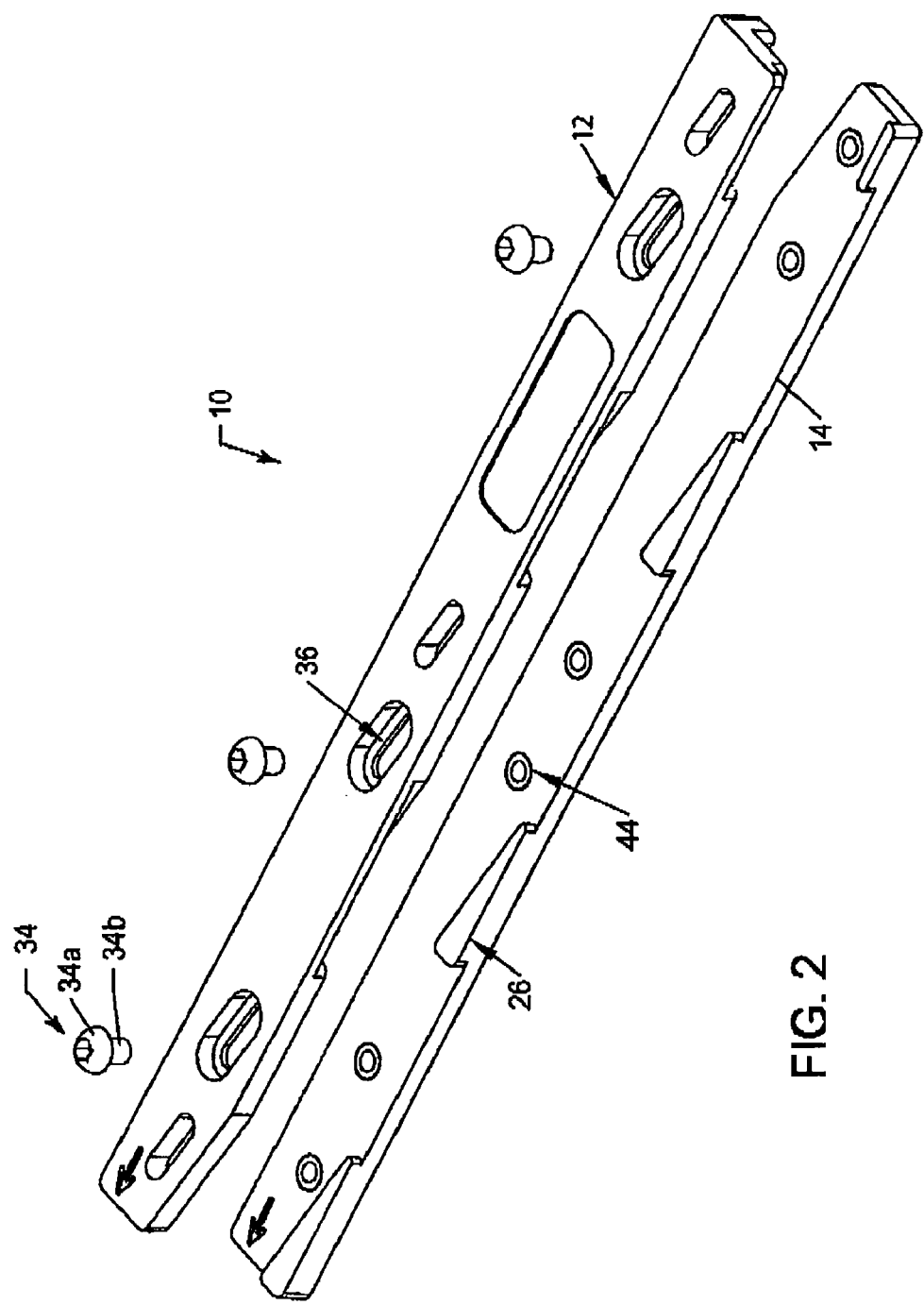
FIG. 2 is a perspective view of a guide bar assembly in position for assembly.
Figure 3:
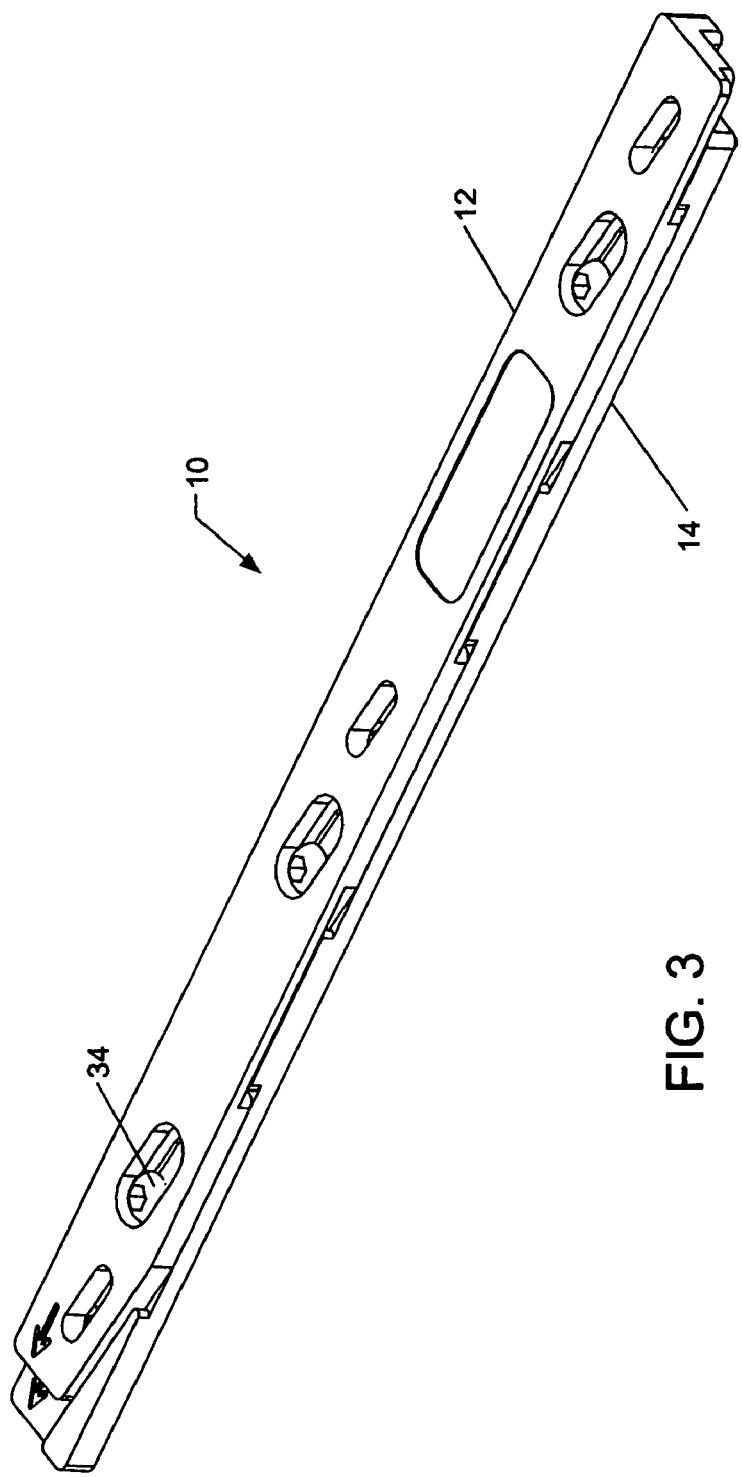
FIG. 3 is a perspective view of an assembled guide bar assembly.
Figure 4:
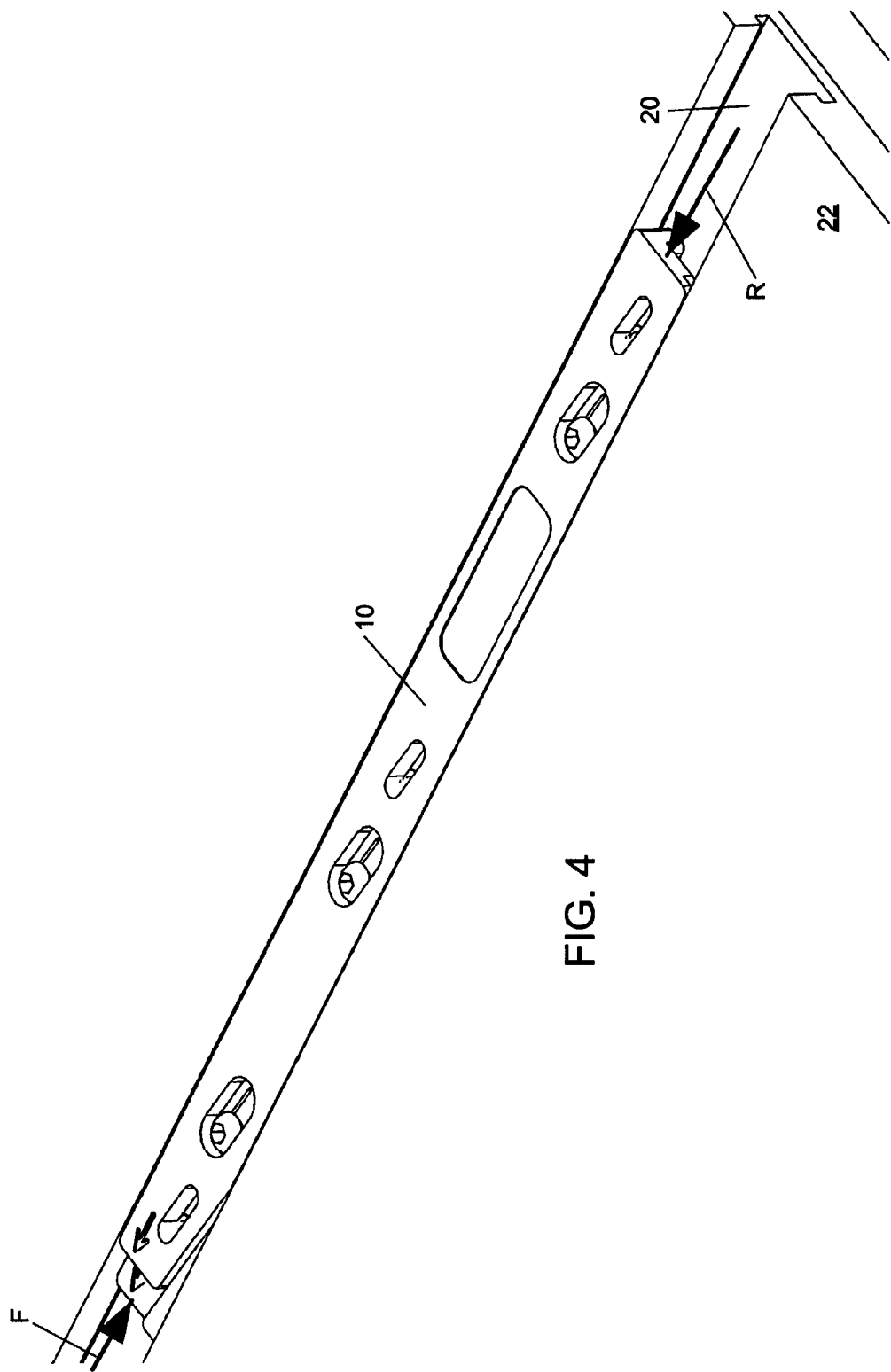
FIG. 4 is a perspective view of a guide bar assembly disposed within a T-slot of a saw table.
Figure 5:
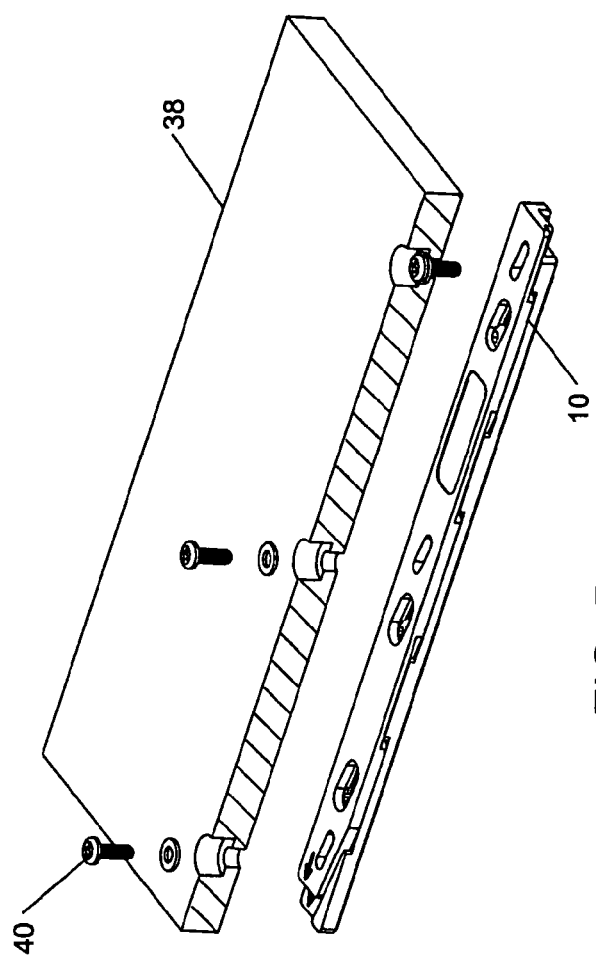
FIG. 5 is a perspective view of a guide bar assembly being attached to a partially cut-away sled.

FIGS. 1-5 illustrate one embodiment of a guide bar assembly 10 in accordance with aspects of the present invention. The guide bar assembly 10 includes a top member 12 disposed on a bottom member 14 when assembled. FIG. 1 illustrates the underside surface 16 of the top member 12 and the topside surface 18 of the bottom member 14 which touch upon assembly, and FIG. 2 illustrates the two members 12, 14 in position ready for assembly. Each of the top member 12 and bottom member 14 has an elongated, generally rectangular, flat shape such that when joined together form an assembly 10 that will fit within a T-slot (or miter slot) of a woodworking table. The members 12, 14 may be formed of a variety of known materials providing the desired qualities such as strength, stability, coefficient of friction and resistance to galling, and in one embodiment are injection molded plastic. FIG. 3 illustrates the assembled guide bar 10, and FIG. 4 shows it in position within a T-slot 20 of a saw table 22. The assembly and operation of the guide bar assembly 10 are described more fully below.

As can best be appreciated in FIG. 1, each of the members 12, 14 includes at least one and preferably a plurality of cooperating pairs of wedge shapes 24. Each pair includes a male wedge shape 26 and a mating female wedge shape 28. Upon assembly of the guide bar assembly 10, the female wedge shape 28 receives the corresponding male wedge shape 26. The male wedge members 26 may be formed to be integral with the respective member 12, 14 or they may be formed separately and joined to the member 12, 14. The female wedge members 28 are preferably formed as a void volume in the respective member 12, 14. Respective contacting side surfaces 30, 32 of the male wedge member 26 and the female wedge member 28 are each disposed to be not parallel to a longitudinal axis L of the guide bar assembly 10 so that relative longitudinal movement between the top and bottom members 12, 14 causes a respective change in width W of the guide bar assembly 10. In one embodiment, the angle formed between the plane of the side surface 30, 32 and a plane passing horizontally through the longitudinal axis L may be about 10 degrees, or in the range of about 5-15 degrees.

After the top and bottom members 12, 14 are joined together, at least one and preferably a plurality of fasteners, such as screws 34 shown in FIGS. 2-4, are passed through respective slots 36 in the top member 12 and joined to the bottom member 14 such as by cooperating threaded inserts 44 with enough tightness to keep the assembly together but loose enough to allow for relative longitudinal sliding movement between the top and bottom members 12, 14. each screw includes a head 34a engaging the top member 12 and a shank 34b passing through the respective slot 36 in the top member 12 to engage the bottom member 14 for affixing the relative positions of the top and bottom members 12, 14. The resulting assembly 10 as shown in FIG. 3 can then be inserted into the slot 20 of the woodworking table 22 as shown in FIG. 4. The width of the assembly 10 is then increased to match that of the width of the slot 20 by sliding the top member 12 relative to the bottom member 14 so that the cooperating action of the mating wedge member side surfaces 30, 32 increases the overall width of the assembly 10. This action is conveniently accomplished by placing a finger or other object to block forward movement of the bottom member 14 within the slot 20, as indicated at arrow F of FIG. 4, and by urging the top member 12 forward from its rearward end as indicated at arrow R of FIG. 4. This action causes the bottom member to come into full parallel contact with the left side wall of the slot and the top member to come into full parallel contact with the right side wall of the slot. Once the desired width of the assembly 10 is achieved, fastener 34 is then tightened to the bottom member to secure the desired width. The slots 36 receiving the screws 34 have a longitudinal axis disposed at the angle relative to the longitudinal axis of the guide bar assembly corresponding to the angle of the wedge shape side surfaces 30, 32.

The present inventor has realized that prior art adjustable guide bars, such as those of U.S. Pat. Nos. 5,402,581 and 6,502,492 described above, are subject to a possible degree of non-parallelism of their two outside side surfaces due to the torque applied when tightening the locking screws. Before the locking screws secure the top and bottom members together, and as the first locking screw is being tightened, the bottom surface of the locking screw head generates a twisting frictional contact with the top member that tends to rotate the top member about the screw so as to become not parallel to the bottom member. As a result, the fit of the guide bar within the T-slot can become loosened, thereby introducing an uncertainty in the positioning of the guide bar. While such tolerances are small, their effect is magnified when extended over a large work piece and a long cut line, and they are cumulative with other tolerances in the woodworking tooling. The present invention avoids this problem by providing area contact along the mating wedge member side surfaces 30, 32. Once the guide bar assembly 10 of the present invention is expanded to a desired width, the top member 12 is thus prevented from rotating relative to the bottom member 14 during the tightening of the screws 34.

The present inventor has found that the device of U.S. Pat. No. 6,502,492 is difficult to expand to a desired width due to a lack of access to the bottom member. Furthermore, it has been found to be difficult to maintain that desired width while tightening the locking screws, since there is no convenient mechanism for securing the bottom member in place. The springs used in the device of U.S. Pat. No. 5,402,581 are helpful in that regard, since they apply a pre-load between the bottom member and the side of the T-slot. However, even the preload can be overcome by the twisting torque applied to the top member during tightening, so the position of the top member relative to the bottom member is not assured. Furthermore, the springs are small and are easy to lose. The present invention solves these problems by providing a device that is easily expanded within the slot with its sides maintained parallel, that is easily secured at a desired width with the sides still maintained parallel, and that avoids the use of small springs.

A further disadvantage of the springs used in the device of U.S. Pat. No. 5,402,581 is that the springs impart a pre-load between the expanded guide bar and the sides of the T-slot. Ideally, the guide bar assembly 10 of the present invention is expanded to match the width of the T-slot, without imparting any significant pre-load, by urging the top member 12 forward with only a light finger pressure. This allows the guide bar assembly 10 to expand to fill the slot 20 with zero tolerance, while at the same time minimizing the friction between the guide bar assembly 10 and the walls of the slot 20 during sliding movement of the assembly 10 within the slot 20.

Figure 6:
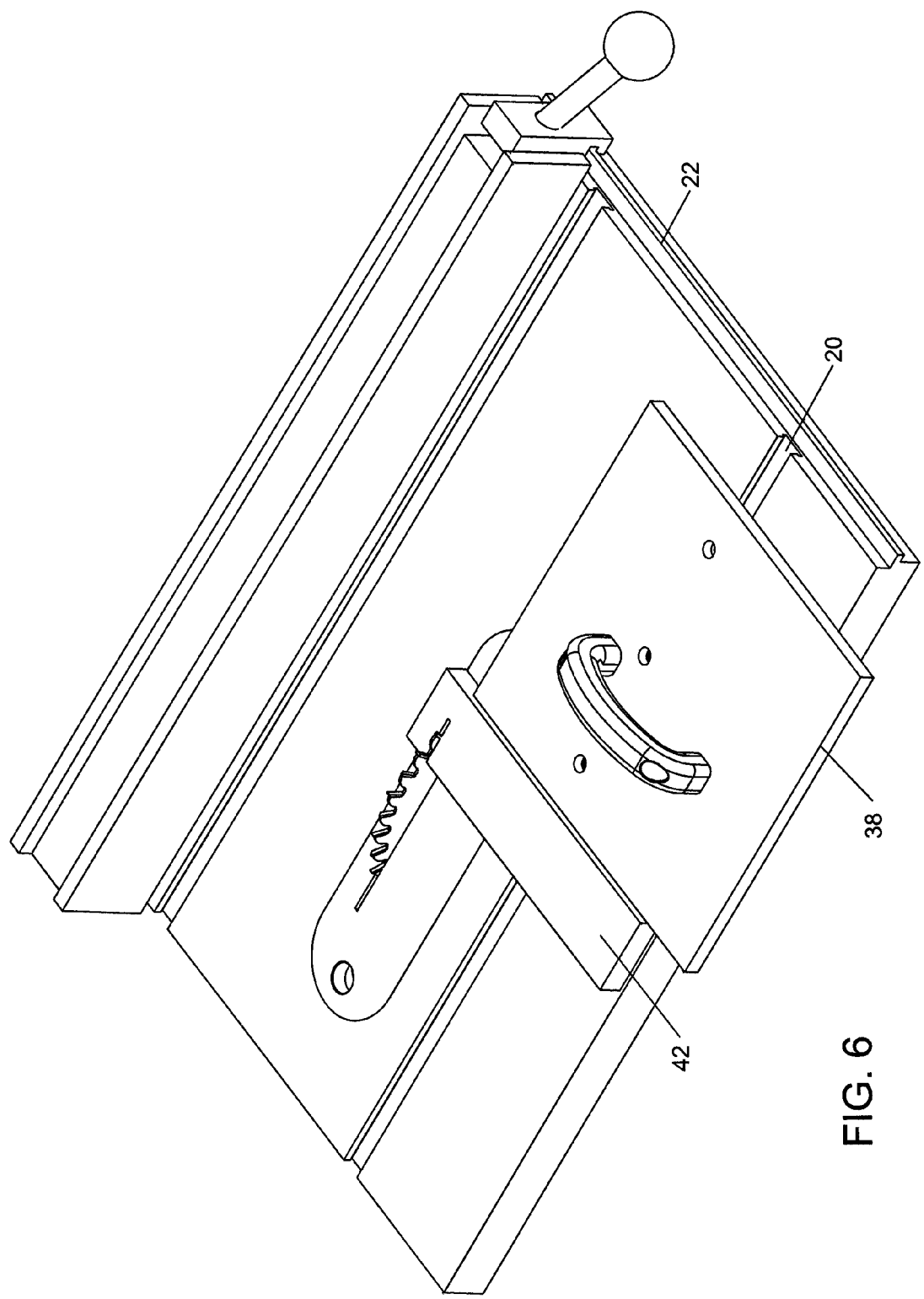
FIG. 6 is a perspective view of the sled of FIG. 5 being used on a table saw with the guide bar assembly disposed within the T-slot of the table.

Once the guide bar assembly 10 is locked into the desired width, it can be removed from the slot 20 and attached to a sled 38. The sled 38 is shown in a partial sectional view in FIG. 5 to illustrate how it is attached to the guide bar assembly 10 via screws 40 or other fasteners. A sled 38 is known in the art as a device that is used to support a work piece 42 during a cross cutting operation on a table saw 22, as illustrated in FIG. 6.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A guide bar assembly in combination with a woodworking table, the table including a Miter-slot extending parallel to a longitudinal axis of the table, the guide bar assembly comprising:
   a bottom member disposed within the miter slot, the bottom member comprising a width and extending in length in a direction parallel to the longitudinal axis of the table;
   an associated top member comprising a width and extending in length in a direction parallel to the longitudinal axis for assembly on top of the bottom member within the Miter-slot;
   a plurality of cooperating pairs of wedge shapes comprising respective opposed side-facing contacting surfaces disposed along the respective top and bottom members;
   wherein the side-facing contacting surfaces of the respective pairs of wedge shapes are disposed at an angle relative to the longitudinal axis such that differential longitudinal movement between the top member and the bottom member when assembled within the Miter-slot results in a proportionate change in an overall width of the guide bar assembly;
   wherein a forward end of the bottom member extends past a respective forward end of the top member, and a rearward end of the top member extends past a respective rearward end of the bottom member to allow the forward end of the bottom member and the rearward end of the top member to be urged toward each other so that the guide bar assembly expands in overall width to make snug parallel contact with opposed side walls of the Miter-slot.

2. The combination of claim 1, further comprising:
   a slot formed in the top member for receiving a fastener selectively tightened to the bottom member to secure a desired width of the guide bar assembly once achieved;
   wherein the slot comprises a longitudinal axis disposed at the angle corresponding to the angle of the contacting surfaces of the wedge shapes.

3. An adjustable guide bar assembly in combination with a woodworking table, a Miter-slot of the table extending parallel to a longitudinal axis of the table, the guide bar assembly comprising:

a top member disposed directly on top of a bottom member within the Miter-slot, a combination of the top and bottom members comprising opposed left and right side surfaces in full parallel contact with respective left and right side walls of the Miter-slot;

a first of the top and bottom members comprising an integrally formed male wedge member extending toward a second of the top and bottom members;

the second of the top and bottom members comprising an integrally formed recess defining a female wedge member disposed to receive the male wedge member when the top member is disposed on the bottom member within the Miter-slot;

contacting side surfaces of the male wedge member and the female wedge member disposed to be not parallel to the longitudinal axis when the guide bar assembly is disposed within the Miter-slot so that relative longitudinal movement between the top and bottom members causes a respective change in overall width of the guide bar assembly.

4. A guide bar assembly in combination with a woodworking table, the table including a Miter-slot extending parallel to a longitudinal axis of the table, the guide bar assembly comprising:

a bottom member disposed within the miter slot, the bottom member comprising a width and extending in length along a longitudinal axis of the table;

an associated top member comprising a width and extending in length along a longitudinal axis for assembly of the guide bar assembly by being laid directly on top of the bottom member within the Miter-slot;

a first male wedge shape extending upward from the bottom member and a cooperating first female wedge shaped recess formed in the top member for receiving the first male wedge shape, the first male wedge shape formed to be wider toward a forward longitudinal end of the bottom member;

a second male wedge shape extending downward from the top member and a cooperating second female wedge shaped recess formed in the bottom member for receiving the second male wedge shape, the second male wedge shape formed to be wider toward a rearward longitudinal end of the top member;

opposed relative longitudinal motion of the respective assembled top and bottom members within the Miter-slot effective to change an overall width of the assembly;

a screw comprising a head engaging the top member and a shank passing through a slot in the top member to engage the bottom member for affixing relative positions of the top and bottom members to a snug parallel fit within the Miter-slot; and wherein opposed contact between the forward-wider and rearward-wider male wedge shapes and respectively opposed surfaces defining the female wedge shaped recesses maintains the top member parallel to the bottom member during the change in overall width and as the screw is tightened to affix the relative positions of the top and bottom members.

5. The combination of claim 4, wherein a forward end of the bottom member extends past a respective forward end of the top member, and a rearward end of the top member extends past a respective rearward end of the bottom member to allow the forward end of the bottom member and the rearward end of the top member to be urged toward each other.

* * * * *